United States Patent [19]

Totsuka et al.

[11] Patent Number: 5,373,309
[45] Date of Patent: Dec. 13, 1994

[54] METHOD AND APPARATUS FOR SETTING VARIABLE TO DESIRED VALUE

[75] Inventors: Masatoshi Totsuka, Kanagawa; Tohru Takai, Tokyo, both of Japan

[73] Assignee: Sony/Tektronix Corporation, Tokyo, Japan

[21] Appl. No.: 985,023

[22] Filed: Dec. 3, 1992

[30] Foreign Application Priority Data

Dec. 9, 1991 [JP] Japan .................. 3-350204
Apr. 1, 1992 [JP] Japan .................. 4-108528

[51] Int. Cl.⁵ ............................................. G09G 3/02
[52] U.S. Cl. ................... 345/145; 324/121 R; 364/188; 345/134
[58] Field of Search ............... 364/410, 411, 412, 188, 364/189, 190; 340/709; 345/156, 157, 162, 145; 395/148, 147, 146, 144, 145; 324/121 R, 76.12, 76.17

[56] References Cited

U.S. PATENT DOCUMENTS

| | | | |
|---|---|---|---|
| 4,698,625 | 10/1987 | McCaskill | 345/167 |
| 4,761,640 | 8/1988 | Slavin | 345/145 |
| 4,857,902 | 8/1989 | Naimark | 345/167 |
| 5,186,629 | 2/1993 | Rohen | 434/114 |
| 5,187,797 | 2/1993 | Nielsen | 364/188 |
| 5,201,028 | 4/1993 | Theis | 395/2 |

FOREIGN PATENT DOCUMENTS 0027931 2/1985 Japan .

OTHER PUBLICATIONS

Tandy Corp, "Going Ahead with Extended Color Basic", 1981 p. 168, Sample Program #14.

*Primary Examiner*—Alvin E. Oberley
*Assistant Examiner*—Aaron Banerjee
*Attorney, Agent, or Firm*—Smith-Hill and Bedell

[57] ABSTRACT

A variable under operator control is set to a desired value by taking a pause when the value of the variable has been modified such that it would surpass the desired value. Upon meeting the desired value, the value of the variable is set to the desired value for the duration of a pause period, during which the value of the variable remains fixed regardless of further attempts to modify the variable. Therefore, even if the operator is careless, the variable does not pass over the desired values. The variable may represent a voltage or current, or the position of a cursor.

22 Claims, 6 Drawing Sheets

METHOD AND APPARATUS FOR SETTING VARIABLE TO DESIRED VALUE

BACKGROUND OF THE INVENTION

The present invention relates to a method and an apparatus for modifying a variable, more particularly to a method and an apparatus for setting a variable of an electronic instrument to a desired value.

When operating an electronic instrument, it is often required to set various parameters of the instrument, such as voltage, current, frequency and position of a point or cursor, etc. Interfacing devices, such as a rotary knob, mouse, key and/or button, are often used to assist setting these instrument variables.

Figure 1:
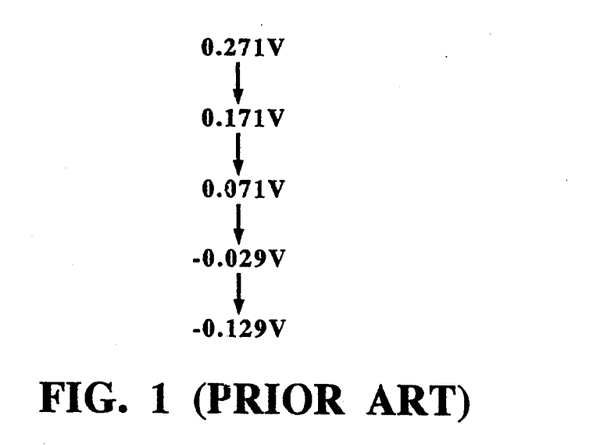
FIG. 1 shows a known method of variable modification.

In some cases of adjustment of a variable X, it is important that the variable X not pass beyond a given reference value Vr. FIG. 1 shows an example of a prior art method for setting a variable X, a voltage, to a desired value Vr, 0 volts. An alternative example could be setting the value of the variable X without letting the value drop below 0 volts. Although an operator could modify the value of the variable X by 0.001V or less by careful operation of the interface device, it is possible that the operator will operate the interface device roughly, such that the variable X would decrease at the rate of 0.1V per operation of the interface device. Therefore the operator could accidentally adjust the value of the variable X below 0V. To avoid dropping below 0V, the operator must use greater care in operating the interface device as the variable X approaches the desired value Vr. Therefore, careless operation of the interface device is unacceptable.

Figure 2:
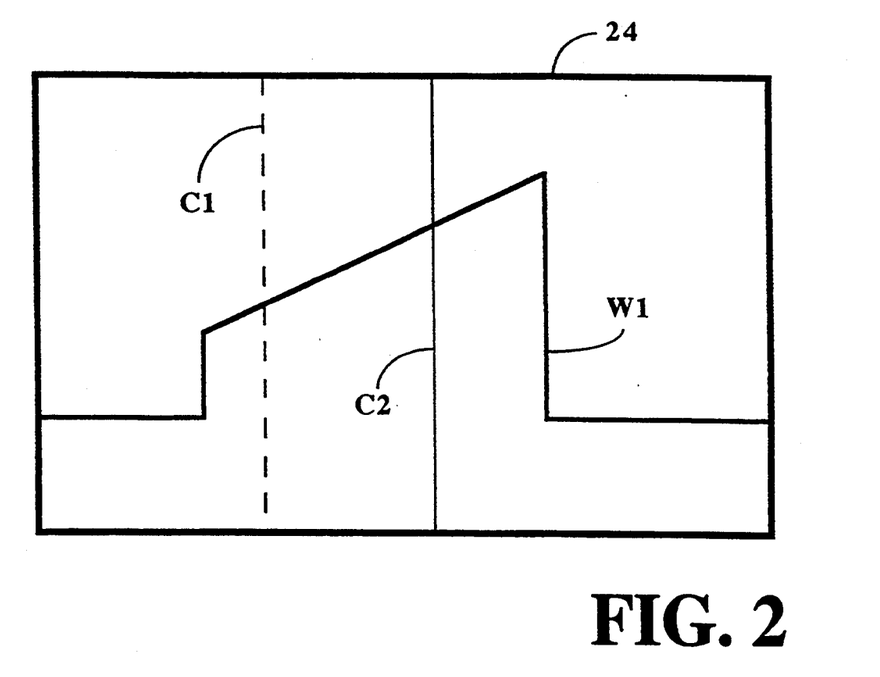
FIG. 2 shows two vertical line cursors on a waveform which is being edited on the display of a waveform generator.
Figure 3:
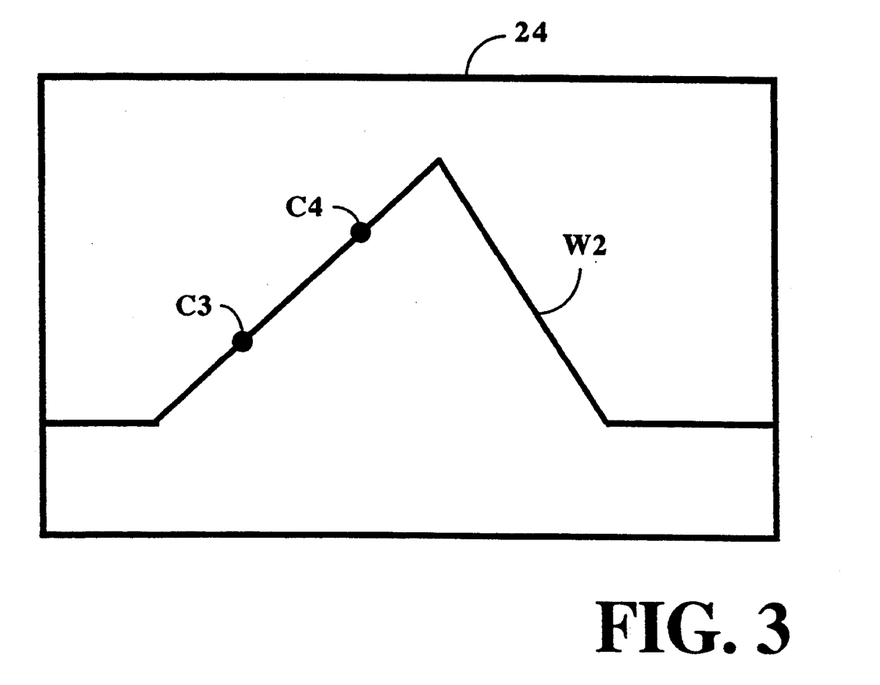
FIG. 3 shows two point cursors on a waveform which is being edited on the display of a waveform generator.

FIG. 2 shows a display waveform W1 and two vertical line cursors C1 and C2 which can be moved freely under operator control on the display in the horizontal direction. FIG. 3 shows a waveform W2 and two point cursors C3 and C4 which can be moved freely on the waveform W2. In the case of a waveform generator, the two cursors could be used to specify a region of one waveform within which to substitute another waveform to generate a new waveform signal. The two cursors could also be used for indicating where to insert markers on the waveform. In the case of an oscilloscope, the cursors could be used for measuring a waveform parameter, such as a time difference and/or a voltage difference between the two cursors.

It is known to simultaneously display two cursors on the display and independently control them while editing waveforms or making waveform measurements. For some critical applications for editing a waveform or making waveform measurements, it may be required that the cursors be accurately superimposed on top of one another. If an operator is carelessly operating the knob or other interface device for moving the first cursor C1 (or C3) toward the second cursor C2 (or C4), then as the second cursor approaches the first cursor, the operator could accidentally cause the second cursor to pass over the first cursor.

Therefore, it is desired to provide a method and an apparatus for setting a variable, such as voltage or current, or the position of a cursor, to a desired value via operation of an interface device, wherein the method and apparatus are tolerant of somewhat careless operation of the interface device. It is further desired to provide a method and an apparatus for adjusting a plurality of variables to the same value via control of the interface device, of which the method and apparatus are again tolerant of somewhat careless operation of the interface device and provide an operator a means to easily confirm the adjustments.

SUMMARY OF THE INVENTION

The present invention provides a method and an apparatus for setting a variable of an instrument to a given desired value that an operator can easily confirm. The operator modifies the value of the variable by operating an interface device. When the value of the variable meets the desired value, a pause is taken. The value of the variable remains fixed at the desired value or at a value less than one modification step preceding the desired value for a given period of time. In this manner, the operator is able to easily set the value of the variable to, or near, the desired value while operating the interface device in a somewhat careless manner.

The foregoing objects, advantages and novel features of the present invention will be apparent from the following detailed description when read in conjunction with the appended claims and attached drawings.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 4:
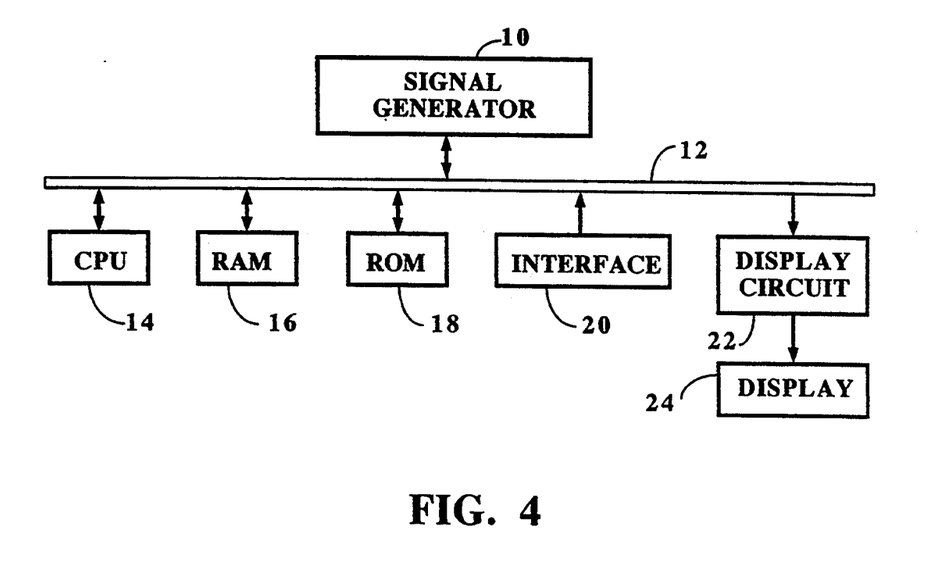
FIG. 4 is a block diagram of a preferred system according to the present invention.

FIG. 4 shows a block diagram of an arbitrary waveform generator system. The system comprises a signal generator 10 and a microprocessor system which defines what waveforms will be produced by the arbitrary waveform generator system. The microprocessor system comprises a central processing unit (CPU) 14, a working memory 16, such as RAM, a static memory 18, such as ROM, and an interface device 20, such as a keyboard, rotary knob and/or mouse, for data entry and adjustment operations. A bus 12 provides electrical coupling between the elements of the microprocessor system and the signal generator. A display circuit 22 formats compiled data which will be shown on a display 24. For example, if the display is a raster scan CRT, the display circuit 22 arranges the data into a frame buffer memory, in which the memory locations correspond on a one-to-one basis with the array of pixels of the display 24. The image that is shown on the display includes at least two cursors.

Operation of the interface device generates a cursor shift command. The cursor shift command includes both a direction and a magnitude. In the case of the interface device being a rotary knob, the direction component of the cursor shift command depends on the direction of rotation and the magnitude depends on the angle through which the knob is rotated. The cursor shift command is applied to the CPU 14, which provides cursor position data to the display circuit for controlling the position at which each cursor is displayed.

Figure 5:
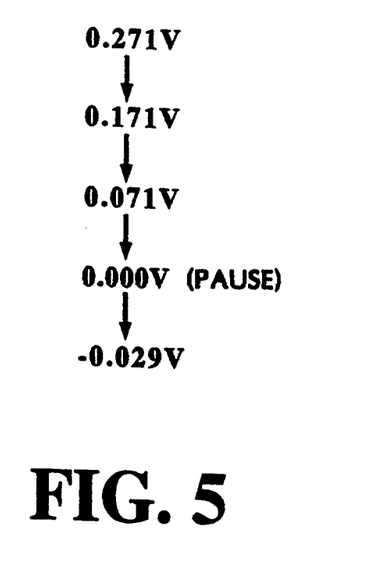
FIGS. 5 and 6 show modifications of a variable according to the present invention.
Figure 6:
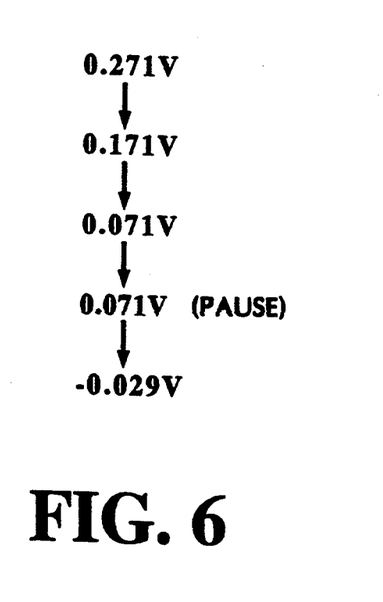

FIGS. 5 and 6 show modification of a variable X, such as a voltage, in which the reference value Vr is 0. When the operator adjusts the interface device roughly, the variable X decreases at the rate of 0.1V per operation (angular rotation) of the interface device (knob) until meeting a value (0.071V) that differs from the reference value by less than one step (0.1V), so that another 0.1V step would pass beyond the reference value and produce an overshoot, −0.029V.

Referring to FIG. 5, upon the occurrence of another operation of the interface device, the variable X is set to the reference value 0V and takes a pause for a given period, e.g. one second. During the pause period, the variable X remains fixed at the reference value 0V in spite of subsequent knob rotations in the same direction. The method of FIG. 5 is useful for those applications in which the instrument's internal controller can easily set the variable X to the reference value, 0V.

Referring to FIG. 6, the variable X takes a pause at 0.071V, so that the variable X does not pass over the 0V reference value. During the pause period, the variable X remains fixed at this 0.071V value, which precedes the reference value by less than one modification step, regardless of subsequent knob rotations in the same direction.

After the pause, if the operator continues operating the interface device to modify the variable X in the same direction, the value of the variable X proceeds beyond the reference value and again changes according to operations of the interface device. If, during the pause, the operator operates the interface device so as to modify the variable X in the opposite direction, the pause is quickly interrupted and the variable X moves in the direction opposite the former direction and again changes according to operations of the interface device. These pauses allow the careless operator to easily set the variable X either to or near the desired value Vr without overshooting beyond the desired value Vr.

With reference to FIG. 2, it is easy to superimpose the two vertical line cursors C1 and C2 of the display according to the present invention. When editing the waveform W1 produced by the signal generator 10, one of the two vertical cursors C1, shown as a dotted line, remains stationary, while the operator moves the other cursor C2, using the interface device. When C2 meets C1, C2 takes a pause for a given period of time. The pause thus allows the operator to easily superimpose the two cursors without having to make careful adjustments with the interface device. FIG. 3 shows another case, similar to FIG. 2, using point cursors instead of vertical line cursors. The two point cursors may be superimposed in a similar manner as explained above for the vertical line cursor.

Figure 7:
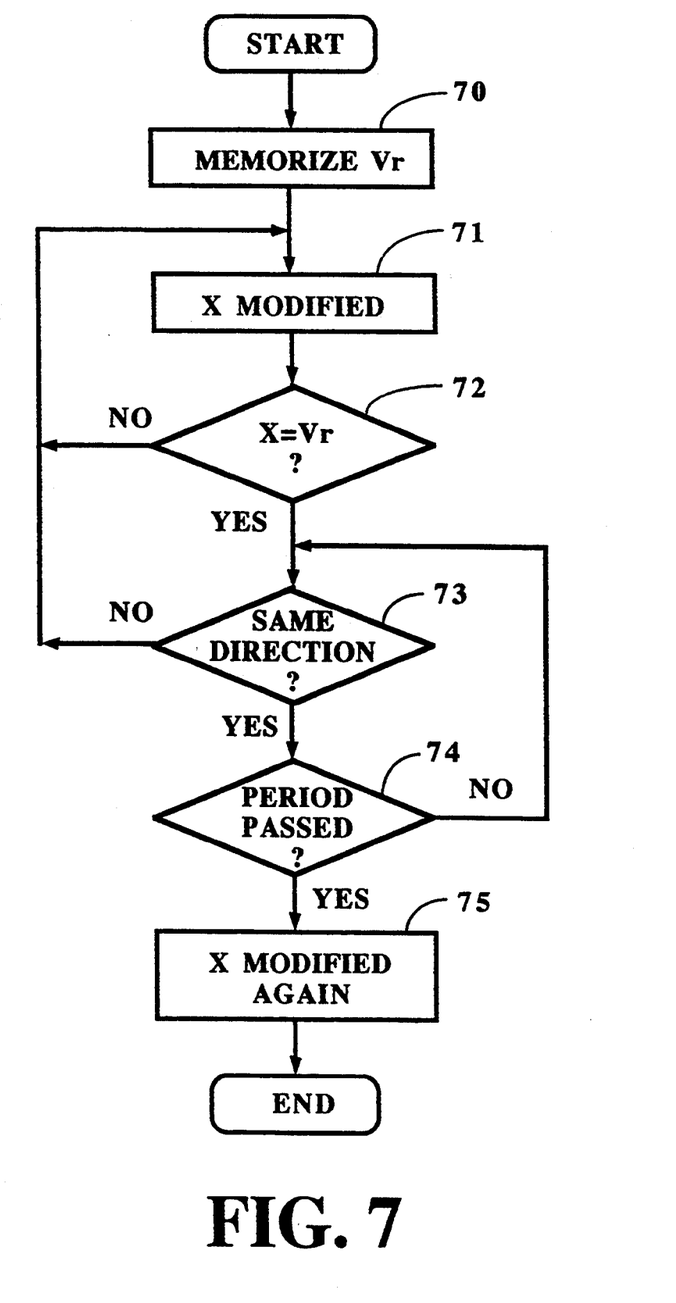
FIG. 7 shows a flow chart illustrating a preferred method according to the present invention.

FIG. 7 shows a flow chart that is helpful in illustrating a preferred embodiment of the present invention. An algorithm corresponding to this flow chart would be programmed and stored into the ROM 18. In step 70, the CPU 14 stores into RAM 16 a desired reference value Vr as received from an operator via the interface device 20. In step 71, the variable X is modified in response to the operation of the interface device 20. In step 72, the CPU 14 compares the variable X with the reference value Vr. When a particular operation of the interface device is received, which indicates that the value of X should either pass over or equal Vr, then the variable X is either set to Vr or left at its present value, which is one modification step preceding Vr. In step 73, the modifying direction for the variable X is detected. Steps 73 and 74 form a loop in which a given pause period, such as one second, is counted and the variable X takes a pause. During the pause period, the variable X remains fixed in spite of additional operations of the interface device 20 in the same direction. If the modification direction for the variable X is reversed during the pause period, the loop is interrupted and program control returns to step 71 from step 73. If the modification direction for the variable X remains the same during the pause period, then program control advances to step 75 once the pause period expires. In step 75, the variable X is again modified according to operations of the interface device 20. In this manner, the operator is able to easily confirm an agreement between the variable X and the desired value Vr.

Figure 8:
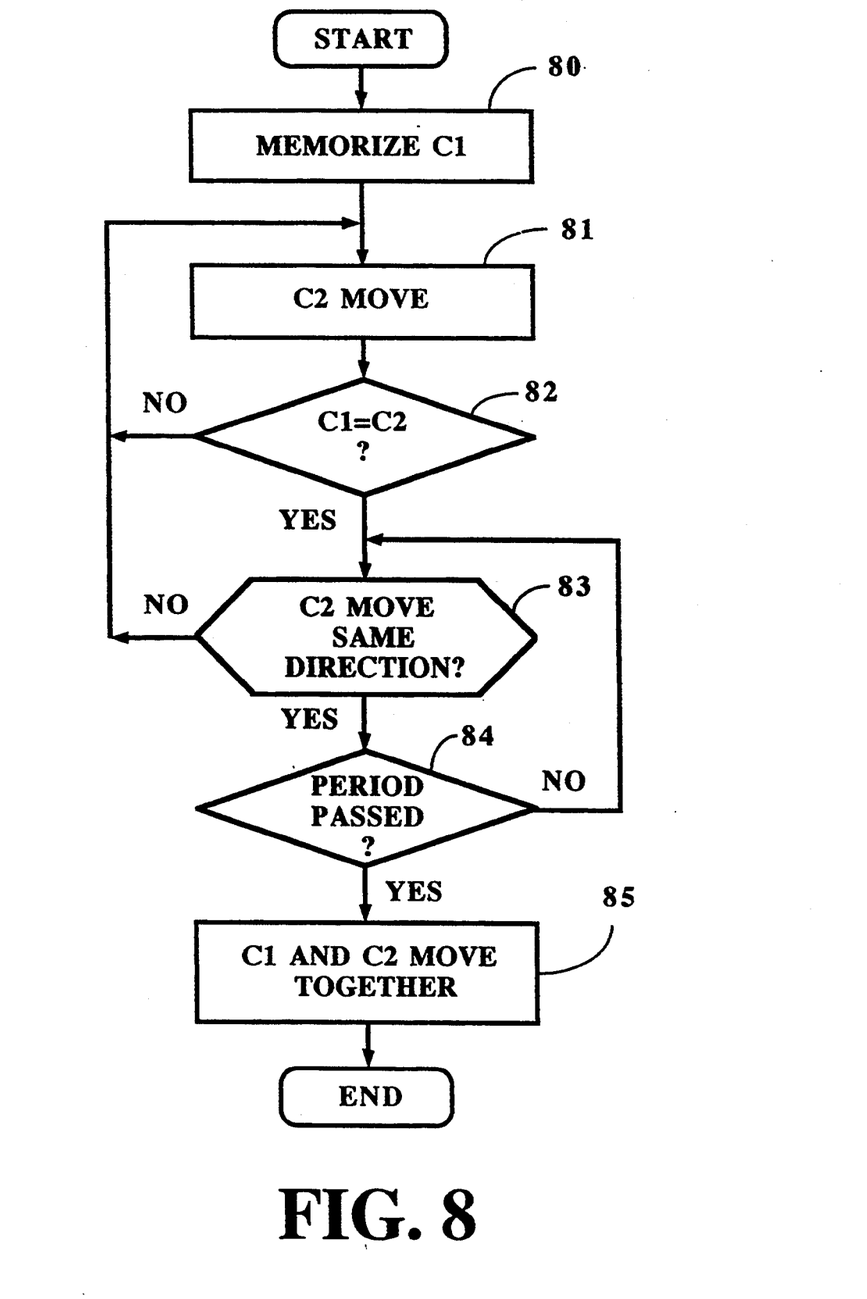
FIG. 8 shows flow chart illustrating another method according to the present invention.

FIG. 8 shows a flow chart illustrating another preferred embodiment of the present invention. In accordance with FIG. 8, modification of the variable X is used to position one cursor with respect to another cursor. In advance, the operator selects, via the interface device 20, a display mode for displaying at least two cursors C1 and C2 and selects one of the cursors, for example the first cursor C1, to remain stationary. In step 80, the CPU 14 stores into RAM 16 the position data of the first cursor C1. In step 81, the second cursor C2 moves toward the first cursor C1 according to the cursor adjustment operations of the interface device 20 which may be operated continuously for continuously changing the position data of the second cursor C2. In step 82, the CPU 14 reads the position data of the first cursor C1 from RAM 16 and compares this position data with that of the second cursor C2. If the data of the two positions differ from one another, then program control returns to step 81 and the second cursor C2 again moves according to cursor position operations of the interface device 20. On the other hand, if the data representative of the two cursor positions are equal to one another, the program control advances to step 83. In step 83, the CPU 14 determines whether the interface device 20 is providing data for moving the second cursor C2 continuously in the same direction. If the direction of movement is the same, then program control shifts to step 84. Steps 83 and 84 form a loop in which a predetermined pause period, for example one second, is counted while the second cursor C2 takes a pause. During the pause period, the second cursor remains fixed in spite of further adjustment operations of the interface device 20. If the direction of movement for C2 is reversed during the pause period, then program control leaves the pause counting loop at step 83 and returns to step 81. If the direction of movement for C2 remains the same during the pause period, then program control advances to step 85 after the pause period expires. In step 85, the second cursor again moves according to adjustment operations of the interface device 20. The second cursor may move alone or together with the first cursor according to the operator's selection via the interface device 20.

It will be appreciated that the procedure described with reference to FIG. 8 is applicable also to the point cursors C3 and C4 shown in FIG. 3.

Figure 9:
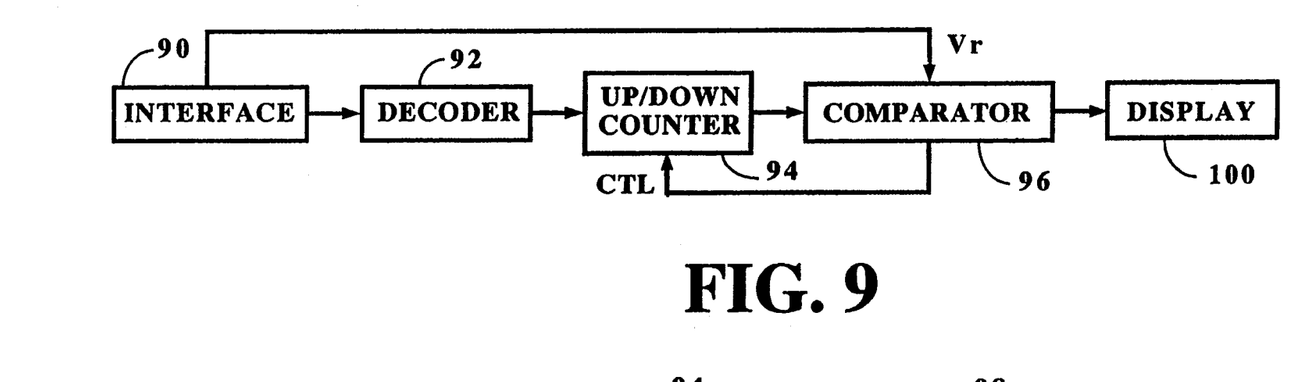
FIG. 9 shows a block diagram of a preferred hardware embodiment according to the present invention.

FIG. 9 shows a block diagram of a preferred embodiment of the present invention without using a CPU. An interface device 90, such as a rotary knob or key, provides the operator means for setting a desired value Vr and controlling a variable X. The variable X could represent cursor position, voltage, current, frequency, etc. A decoder 92 decodes the output signal received from the interface device 90 and provides data for counting an up/down counter 94. A comparator 96 compares the output from the up/down counter 94 with the previously entered desired value Vr. As long as the output value from the up/down counter 94 does not equal the value Vr, the comparator 96 sends the value of the up/down counter 94 to the display circuit 100. When the output value from the up/down counter 94 meets the value Vr, the comparator 96 stops the up/down counter 94 for a given pause period and provides the variable X with the value Vr or the value less than one modification step preceding Vr, as shown in FIG. 6. If the modification direction for the variable X remains the same after the pause period expires, the counter is re-enabled and resumes counting according to adjustment operations of the interface device 90, and the comparator again sends the value of the up/down counter 94 to the display circuit 100. Should the modification direction for the variable X be reversed during the pause period, then the pause is interrupted, the counter re-enabled and the variable X is again modified according to adjustment operations of interface device 90.

Figure 10:
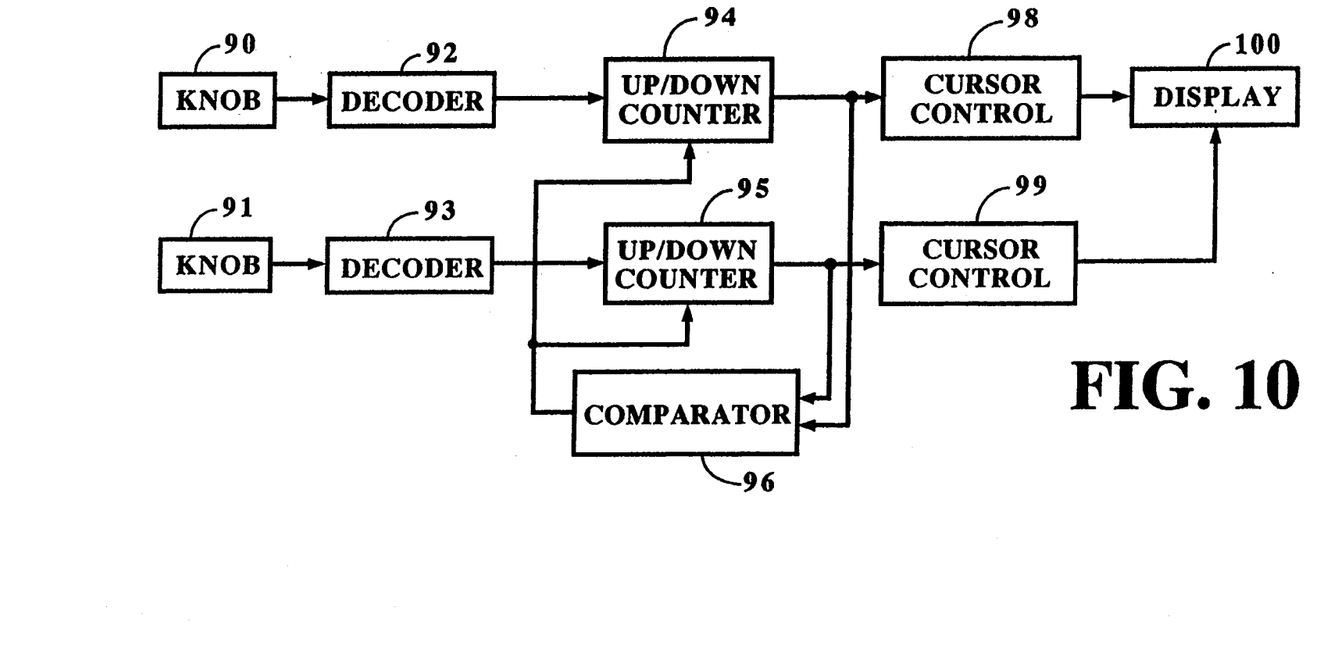
FIG. 10 shows a block diagram of another preferred hardware embodiment according to the present invention.

FIG. 10 shows a block diagram of another preferred embodiment according to the present invention without using a CPU, which would be used for controlling the position of one cursor with respect to another cursor. Interface devices 90 and 91, such as first and second rotary knobs, allow the operator to control the positions of first and second cursors, respectively, on the display. Decoders 92 and 93 decode the outputs from respective interface devices 90 and 91, and each decoder provides a sequence of pulses representative of adjustment operations, such as angular rotations, of respective rotary knobs. The up/down counters 94 and 95 count the pulses according to the rotation direction of the corresponding knobs 90 and 91. The output values from the counters 94 and 95 correspond to respective positions of the first C1 and second C2 cursors on the display 100. A comparator 96 compares the counter values, and when the counter values meet, the comparator 98 produces a pause for a given pause period. During the pause period, each counter is disabled and the values remain fixed in spite of subsequent knob rotations in the same angular direction. Therefore, it becomes very easy for an operator to accurately superimpose the two cursors and confirm that they occupy the same position.

It will be appreciated that the invention is not restricted to the particular embodiments that has been described, and that variations may be made therein without departing from the scope of the invention as defined in the appended claims and equivalents thereof. For example, the present invention could also be used for similarly adjusting more than two variables and/or cursors. The cursors could comprise lines, commas, points, arrows or other geometric symbols. Although the invention has been described above in association with a signal generator, it may also be used for controlling variables and cursors of an oscilloscope.

We claim:

1. A method of operating an instrument having a display means for displaying a cursor at a position that depends on current value of a variable and an interface means for controlling the position of the cursor by adjusting the current value of the variable within a range, said method comprising:

selecting a desired value for the variable, corresponding to a desired position of the cursor, the desired value being different from an initial current value, corresponding to an initial position of the cursor, and being such that the range extends beyond the desired value in two directions;

storing the desired value;

employing the interface means to continuously provide data of a first polarity such as to modify the current value of the variable in a first direction, said first direction being such as to reduce difference between the initial current value of the variable and the desired value;

comparing the current value of the variable with the desired value; and when the current value of the variable differs from the desired value, responding to the data of the first polarity by continuously reducing the difference between the current value of the variable and the desired value, and when the current value of the variable is equal to the desired value, taking a pause for a pause period during which the current value of the variable remains fixed, whereby the cursor remains at the desired position, while the interface means continues to provide data of said first polarity.

2. A method according to claim 1, comprising modifying said variable according to data provided by the interface means after said pause period expires.

3. A method according to claim 1, wherein the interface means can be operated selectively to provide data of either said first polarity or a second polarity, said second polarity being such as to modify the value of the variable in a second direction, opposite said first direction, and said method comprises the steps of:

determining a present polarity of present output data provided by the interface means;

determining a former polarity of former output data provided by the interface means; and detecting whether the present polarity matches the former polarity during the pause period.

4. A method according to claim 3, further comprising the step of interrupting said pause and modifying the value of the variable according to the output data provided by the interface means when the present polarity does not match the former polarity.

5. A method according to claim 3, comprising:

continuing said pause for a predetermined period if the interface means continues to provide data of said first polarity during said predetermined period, and interrupting said pause before the end of said predetermined period if the interface means provides data of said second polarity; and modifying the variable according to the polarity of said data at the end of said pause.

6. A method according to claim 1, wherein the desired value is a variable.

7. A method according to claim 6, wherein the display means displays a second cursor at a position that depends on the desired value of the variable.

8. A method of operating an instrument having a display means for displaying a cursor at a position that depends on current value of a variable and an interface means for controlling the position of the cursor by adjusting the current value of the variable within a range, said method comprising:

selecting a desired value of the variable, corresponding to a desired position of the cursor, the desired value being different from an initial current value, corresponding to an initial position of the cursor, and being such that the range extends beyond the desired value in two directions;

storing the desired value;

employing the interface means to continuously provide data of a first polarity such as to modify the current value of the variable in a first direction, said first direction being such as to reduce difference between the initial current value of the variable and the desired value;

comparing the current value of the variable with the desired value; and when the current value of the variable differs from the desired value by an amount of at least one modification step, responding to the data of the first polarity by continuously reducing the difference between the current value and the desired value, and when the current value of the variable differs from the desired value by an amount that is greater than zero and less than one modification step, setting the variable to a value less than one modification step preceding the desired value and taking a pause for a given pause period, whereby the cursor remains at its then current position, while the interface means continues to provide data of said first polarity.

9. A method according to claim 8, comprising modifying the value of said variable according to data provided by the interface means after said pause period expires.

10. A method according to claim 8, wherein the interface means can be operated selectively to provide data of either said first polarity or a second polarity, said second polarity being such as to modify the value of the variable in a second direction, opposite said first direction and said method comprises the steps of:

determining a present polarity of present output data provided by the interface means;

determining a former polarity of former output data provided by the interface means; and detecting whether the present polarity matches the former polarity during the pause period.

11. A method according to claim 10, further comprising the step of interrupting said pause period and modifying the value of said variable according to the output data provided by the interface means when the present polarity does not match the former polarity.

12. An apparatus for setting a variable to a desired value that is within a range and is such that the range extends beyond the desired value in first and second directions, said apparatus comprising:

a display means for displaying a cursor at a position that depends on current value of the variable;

interface means for producing first data for controlling the position of the cursor by adjusting the current value of the variable and second data for setting the desired value of the variable, corresponding to a desired position of the cursor, said first data having either a first polarity or a second polarity;

a memory means for storing the desired value set by the interface means;

converting means for receiving the first data from the interface means and modifying the current value of the variable in the first or second direction according to polarity of said first data; and comparing means for comparing the current value of the variable with the desired value, and when the current value of the variable differs from the desired value and the interface means continuously produces first data of the first polarity, which is such as to reduce the difference between the current value and the desired value, causing the converting means to respond to the first data by modifying the current value so as to continuously reduce the difference between the current value and the desired value, and when the current value of the variable meets the desired value in response to the interface means producing first data of said first polarity, causing the converting means to take a pause and stop further modifications of the value of the variable, whereby the cursor remains at the desired position, for a period of time while the interface means continues to provide data of said first polarity.

13. An apparatus according to claim 12, wherein the interface means can be operated selectively to provide data of either said first polarity or said second polarity, said second polarity being such as to modify the value of the variable in a second direction, opposite said first direction, and said apparatus further comprises:

decoder means for receiving the first data and determining a present polarity according to polarity of the first data; and a storage means for storing a former polarity determined by the decoder means, and wherein the comparing means compares the present polarity with the former polarity to determine whether the present polarity matches the former polarity during said period of time.

14. An apparatus according to claim 12, wherein the comparing means is further operative to re-enable the converting means after the expiration of said period of time so that the converting means is again operative to modify the value of said variable in the first or second direction according to polarity of said first data.

15. An apparatus according to claim 13, wherein the comparing means is further operative to interrupt the pause and re-enable the converting means when the present polarity does not match the former polarity.

16. An apparatus according to claim 12, wherein the display means displays a second cursor at a position that depends on the desired value of the variable.

17. An apparatus according to claim 12, wherein said desired value is a variable.

18. An apparatus for setting a variable to a desired value that is within a range and is such that the range extends beyond the desired value in first and second directions, said apparatus comprising:

a display means for displaying a cursor at a position that depends on current value of the variable;

interface means for producing first data for controlling the position of the cursor by adjusting the current value of the variable and second data for setting the desired value of the variable, corresponding to a desired position of the cursor, said first data having either a first polarity or a second polarity;

a memory means for storing the desired value set by the interface means;

converting means for receiving the first data from the interface means and modifying the current value of the variable in the first or second direction according to polarity of said first data;

comparing means for comparing the current value of the variable with the desired value and, when the current value of the variable differs from the desired value by an amount of at least one modification step and the interface means continuously produces first data of the first polarity, which is such as to reduce the difference between the current value and the desired value, causing the converting means to respond to the first data by modifying the current value so as to continuously reduce the difference between the current value and the desired value, and when the current value of the variable differs from the desired value by an amount that is greater than zero and less than one modification step in response to the interface means producing first data of said first polarity, setting the variable to a value less than one modification step preceding the desired value and disabling the converting means from further modifying the value of the variable for a given period of time, whereby the cursor remains in its then current position, while the interface means continues to provide data of said first polarity, thereby effecting a pause.

19. An apparatus according to claim 18, wherein the interface means can be operated selectively to provide data of either said first polarity or said second polarity, said second polarity being such as to modify the value of the variable in a second direction, opposite said first direction, and said apparatus comprises:

decoder means for receiving the first data from the interface means and determining a present polarity according to polarity of the first data; and a storage means for storing a former polarity determined by the decoder means, and wherein the comparing means compares the present polarity with the former polarity to determine whether the present polarity matches the former polarity during said period of time.

20. An apparatus according to claim 18, wherein the comparing means is further operative to re-enable the converting means after the expiration of said period of time so that the converting means is again operative to modify the value of said variable in the first or second direction according to polarity of said first data.

21. An apparatus according to claim 19, wherein the comparing means is further operative to interrupt the pause and re-enable the converting means when the present polarity does not match the former polarity.

22. An apparatus as recited in claim 21, further comprising a display and wherein the value of the variable and the desired value are representative of positions for a cursor on the display.

* * * * *